United States Patent  [15] 3,694,088
Gallagher et al.  [45] Sept. 26, 1972

[54] WAVEFRONT MEASUREMENT

[72] Inventors: John Everett Gallagher, Scotch Plains; Donald Richard Herriott, Morris Twp., Morris Cty., both of N.J.

[73] Assignee: Bell Telephone Laboratories, Incorporated, Murray Hill, N.J.

[22] Filed: Jan. 25, 1971

[21] Appl. No.: 109,220

[52] U.S. Cl. .................................................. 356/106
[51] Int. Cl. .................................................. G01b 9/02
[58] Field of Search .............................. 356/106–113

[56] References Cited

UNITED STATES PATENTS 3,127,465  3/1964  Stephen ..................... 356/106
3,527,537  9/1970  Hobrough .................. 356/109

Primary Examiner—Ronald L. Wibert
Assistant Examiner—Conrad Clark
Attorney—R. J. Guenther and Arthur J. Torsiglieri

[57] ABSTRACT

A conventional interferometer has been modified so that amplitude and phase information contained in an interference pattern may be calculated from intensities read out by a television camera and phase shifts introduced by rotation of a quarter-wave plate. To operate the device, reference light at a first phase is interfered on the television camera with light from the object being tested. Such an object might be a lens. The camera samples the intensity of the interference pattern at an array of points; and these values of intensity are stored in a computer. Next, a known phase shift is introduced into the reference beam by rotating the quarter-wave plate; and the intensity in the resulting interference fringe pattern is again sampled at the same points in the array and stored. This process is again repeated for a second known phase shift. Because the three values of intensity obtained at each point in the array are interrelated by the fact that the intensity at any point in the interferogram is a cosinusoidal function of phase, simultaneous solution at each point of three equations corresponding to the three values of intensity produces phase and amplitude plots of the wavefront from the object under study. Alternatively, by making several measurements of the intensity over phase angles from zero to $2\pi$, it is possible to form phase and amplitude plots by determining Fourier coefficients.

17 Claims, 4 Drawing Figures

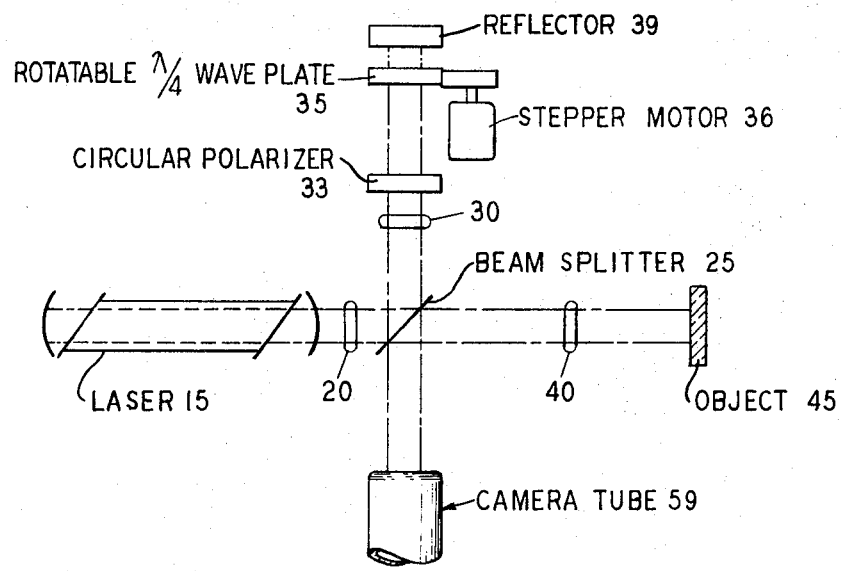
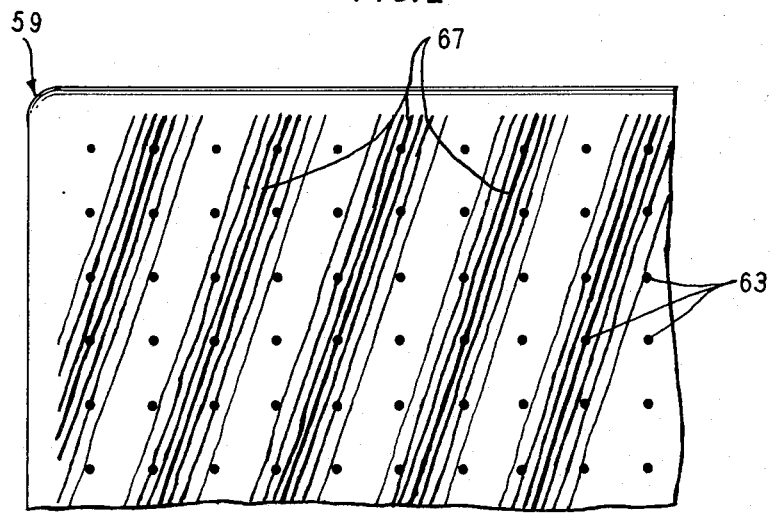

WAVEFRONT MEASUREMENT

BACKGROUND OF THE INVENTION

This concerns a wavefront measuring method and apparatus and in particular a method and apparatus for interferometrically measuring the wavefront from an object.

In previous wavefront measuring systems, light from the object under study, such as a lens, was typically interfered with a reference wavefront on a photographic plate to form an interferogram. This interferogram was then scanned by a high-speed densitometer; and the data collected by the densitometer was analyzed by a computer to form plots of the phase and amplitude of the wavefront from the object under study. This method, however, is subject to noise in the form of spurious fringe patterns and cannot be used to make on-line corrections of the object under study because it is so slow. In addition, nonlinearities in the recording media usually prevent an accurate measurement of the amplitude.

Recently, various photodetector schemes have been devised to detect the location of the fringes in the interference pattern. For example, as reported by Dutton et al. in "A Semiautomatic Method For Interpreting Shearing Interferograms" *Applied Optics*, Vol. 7, No. 1, page 125, (June 1968), the interference patterns from a lens under study are imaged onto a slit-shaped aperture; and the light intensity in the pattern is measured as a function of position by scanning the pattern across the aperture. Again, however, this method is relatively slow. It also leads to a rather complicated interference pattern that is difficult to analyze. Another system is described by Crane in "Interference Phase Measurement" *Applied Optics*, Vol. 8, No. 3, page 538 (March 1969). In this apparatus, two detectors are used to determine the location of the fringe pattern. One of these is a reference detector against which the observed intensity at the other detector is compared. Simultaneously, the frequency or the phase in the reference arm of the interferometer is continuously varied. This system is complicated by the fact that comparison must be continuously made between the two signals detected.

SUMMARY OF THE INVENTION

It is an object of this invention to facilitate the measurement of wavefronts and in particular the measurement of the phase and the amplitude of wavefronts.

It is a further object of this invention to facilitate the analysis of lenses by measuring the wavefronts from such lenses. Such analysis enables one to locate defects in the lenses as well as estimate the resolution that can be obtained with them.

These and other objects are accomplished in an illustrative embodiment of the invention using an interferometer that permits the solution of a set of equations describing the phase and amplitude of the wavefront at certain points in the wavefront. The interferometer that is used is a conventional interferometer modified so that read out is accomplished by a television camera and prescribed phase shifts are introduced by rotation of a quarter-wave plate. An interference pattern from the object being tested, such as a lens, is formed on the television camera and is sampled at an array of points on the camera. A series of measurements is then made using different phase relations between the interference beam of the interferometer and the return beam from the object being tested.

In one method of operating this device, three measurements are made of the intensity at each of the points of the array on the camera tube. For each of these measurements there is a different phase relation between the reference beam and the beam from the object being tested. Because the three values of intensity obtained at each point in the array are interrelated by the fact that the intensity in any point in the interferogram is a cosinusoidal function of phase, simultaneous solution at each point of three equations corresponding to the three values of intensity produces phase and amplitude plots of the wavefront from the object under study.

Alternatively, several measurements of the intensity can be made at each point as the phase is varied from zero to $2\pi$. These values of intensity and phase can then be used to determine a set of Fourier coefficients from which it is possible to calculate the phase and amplitude plots of the wavefront from the object under study.

The phase maps produced by these methods can have contour intervals of less than half a wavelength. Amplitude and intensity distributions and Modulation Transfer Functions (MTF) have better accuracy than can be obtained with conventional MTF measuring equipment.

BRIEF DESCRIPTION OF THE DRAWING

These and other objects and features of our invention will become more readily apparent from the detailed description of the invention taken in conjunction with the following drawing in which:

FIG. 1 depicts in schematic form an illustrative interferometer used in practicing the invention;

FIG. 2 depicts a relationship between the interference fringes formed by the device of FIG. 1 and a camera tube used in that device.

DETAILED DESCRIPTION OF THE DRAWING

Figure 3:
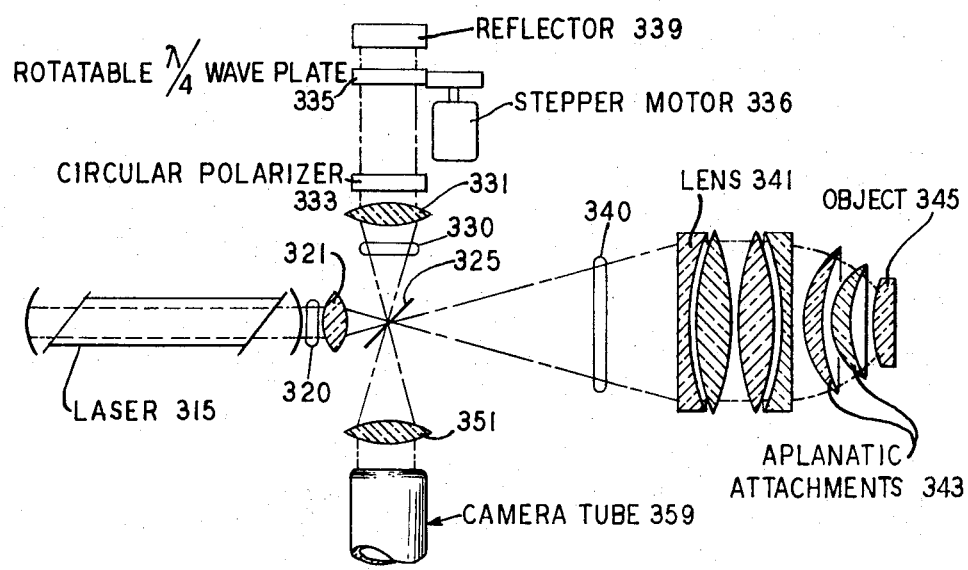
FIGS. 3 and 4 depict in schematic form illustrative embodiments of the invention used in measuring surfaces of lens elements and in evaluating said elements or complete lenses.

An illustrative embodiment of the invention is schematically represented in FIG. 1. This embodiment is an interferometer 11 that has been modified so as to introduce changes in the phase relation between the reference beam of the interferometer and the beam from the object being studied. In addition, the interference pattern that is formed is located on a camera tube. Interferometer 11 is comprised of a laser 15, a beam splitter 25, a reflector 39 in the reference arm of the interferometer, an object 45 to be tested, and a camera tube 59. Typically, laser 15 is a helium-neon laser and camera tube 59 is an RCA Model 8507A Vidicon. In the reference arm of the interferometer are a circular polarizer 33 and a rotatable quarter-wave plate 35 that are used to change the phase relation between the reference beam and the information beam from object 45. Quarter-wave plate 35 is rotated about its axis by stepper motor 36. A shaft encoder (not shown) monitors the angular orientation of plate 35.

To form on camera tube 59 an interference pattern representative of the wavefront from object 45, a beam 20 of coherent light from laser 15 is directed to beam splitter 25 where beam 20 is divided into a reference beam 30 and an information beam 40. Laser light is ordinarily plane polarized. Reference beam 30 is rendered circularly polarized by circular polarizer 33. Reference beam 30 is then incident on quarter-wave plate 35, is reflected by reflector 39, and retransmitted back through quarter-wave plate 35 and circular polarizer 33 to beam splitter 25.

Simultaneously, information beam 40 is directed toward object 45. Some of the light from object 45 is reflected back toward beam splitter 25. The two beams returned from reflector 39 and object 45 are recombined by beam splitter 25 and are then incident on the face of camera tube 59. There they form an interference pattern. Preferably, as is customary in the art, the exit pupil is imaged onto the face of camera tube 59. In some applications an auxiliary lens (not shown) may be necessary to form this image.

The face of camera tube 59 is shown in FIG. 2. The interference fringes that are formed by the two beams from beam splitter 25 are shown as fringes 67. The intensity in this interference pattern is sampled at an array of points 63 on the face of the camera tube. The number of sampling points required in practicing the invention varies with the object being tested. Preferably, there should be at least one row of sampling points for every light fringe and another row of sampling points for every dark fringe. As shown in FIG. 2, there are a total of five rows of sampling points for every pair of one light fringe and one dark fringe. In practicing the invention, arrays of 16×16 and 32×32 sampling points have been used. The points are sampled by feeding the output of camera tube 59 to a conventional video analyzer such as the Colorado Video Analyzer Model 321A supplied by Colorado Video, Incorporated, and controlled by a PDP-8I computer manufactured by Digital Equipment Corporation. Because the details of sampling the intensity on a camera tube follow conventional procedures, they will not be discussed further.

After the intensity at each of the points 63 on the face of camera tube 59 is measured, the phase relation between reference beam 30 and information beam 40 is changed. As will be obvious to those skilled in the art, this is accomplished by using stepper motor 36 to rotate quarter-wave plate 35 about an axis parallel to the direction of propagation of beam 30. The amount of the phase shift, which is read out by the shaft encoder on motor 36, should, of course, produce a different phase relation between the two beams. A second interference pattern is then formed on the face of camera tube 59 following exactly the same procedures detailed above. The intensity in this interference pattern is then measured at the same points 63 on the camera tube. When these measurements are completed, the phase relation between reference beam 30 and information beam 40 is again altered an amount that will produce a new phase relation between the two beams. The two beams are then interfered and the intensity at the same points 63 in the resulting interference pattern is measured.

As is well known, the intensity in an interference pattern is a sinusoidal (or cosinusoidal) function of phase. It may be described in general form by $I = I_{dc} + I_o \cos \theta$ where $I$ is the intensity measured, $I_{dc}$ is the background intensity, $I_o$ is the magnitude of the cosinusoidally varying intensity, and $\theta$ is the phase angle. Thus, the three measurements of intensity at each point are interrelated by three equations $$I_1 = I_{dc} + I_o \cos(\alpha)$$
$$I_2 = I_{dc} + I_o \cos(\alpha + \phi_1) \quad (1)$$
$$I_3 = I_{dc} + I_o \cos(\alpha + \phi_2)$$

where $I_1$, $I_2$ and $I_3$ are the three intensities that are measured, $\alpha$ is the phase angle during the formation of the first interference pattern, $\alpha + \phi_1$ is the phase angle during the formation of the second interference pattern and $\alpha + \phi_2$ is the phase angle during the formation of the third interference pattern. These three equations can readily be solved simultaneously at each point to give the values of the three unknowns $I_{dc}$, $I_o$ and $\alpha$. From these values, the phase and amplitude of the beam from object 45 can be determined at each point 63 where the intensity of the interference pattern was measured. Phase plots can then be made having contour intervals of less than half a wavelength. Amplitude and intensity distributions and MTF plots can also be made to accuracies better than those obtained with conventional MTF measuring equipment.

The time required to record the intensity at each of the 256 sampling points in the 16 × 16 array is approximately one-quarter second. For the 1,024 points in the 32 × 32 array, it is about one-half second. The phase relation between beams 30 and 40 is changed in one- or two-tenths of a second. Hence the elapsed time required to measure the intensity at 256 points in three interference patterns is slightly more than 1 second; and the time required to measure the intensity at 1,024 points in three patterns is slightly less than 2 seconds. Although this time is relatively short, perturbations in the interferometer or the atmosphere can affect the interference patterns even in this brief time. To minimize the effects of such perturbations, several cycles of the above-described procedure are made; and the solutions of the simultaneous equations are averaged together to form the phase and amplitude plots. Thus, in practicing the invention, we typically average together at each point the solutions obtained from fifteen sets of three simultaneous equations each. In making all these measurements, we prefer to use random phase relations between the reference beam and the information beam in each of the 45 interference patterns that are formed because this greatly improves the accuracy of the phase and amplitude plot that is calculated.

Alternatively, the phase and amplitude of the beam from object 45 can be determined by measuring the intensity at each point for many different values of the phase relation between beams 30 and 40. These values of intensity and phase can then be used to determine a set of Fourier coefficients from which can be calculated the unknowns $I_{dc}$, $I_o$ and $\alpha$. The three Fourier coefficients $L_1$, $L_2$ and $L_3$ can be shown to be related to the unknowns $I_{dc}$, $I_o$ and $\alpha$ as follows:

$$L_1 = \int_0^{2\pi} I\, d\varphi = \int_0^{2\pi} I_{dc}\, + \int_0^{2\pi} I_o \cos(\alpha + \varphi)\, d\varphi$$
$$= I_{dc} \int_0^{2\pi} d\varphi + 0 = 2\pi I_{dc}$$

$$L_2 = \int_0^{2\pi} I \sin \varphi d\varphi = \int_0^{2\pi} I_{dc} \sin \varphi d\varphi$$
$$+ \int_0^{2\pi} I_o \cos(\alpha + \varphi) \sin \varphi d\varphi = 0$$
$$- I_o \sin \alpha \int_0^{2\pi} \sin^2 \varphi d\varphi = -\pi I_o \sin \alpha$$

$$L_3 = \int_0^{2\pi} I \cos \varphi d\varphi = \int_0^{2\pi} I_{dc} \cos \varphi d\varphi$$
$$+ \int_0^{2\pi} I_o \cos(\alpha + \varphi) \cos \varphi d\varphi = 0$$
$$+ I_o \cos \alpha \int_0^{2\pi} \cos^2 \varphi d\varphi = \pi I_o \cos \alpha$$

(2)

From these expressions it can readily be shown that:
$$I_{dc} = L_1/2\pi$$
$$I_o = (L_2^2 + L_3^2)^{1/2}/\pi \qquad (3)$$
$$\alpha = \arctan(-L_2/L_3)$$

To evaluate $L_1$, $L_2$ and $L_3$ in practice, one approximates the integrals that define these coefficients with the summation
$$L_1 = \Sigma I_i (\phi_i - \phi_{i-1})$$
$$L_2 = \Sigma I_i \sin\phi_i (\phi_i - \phi_{i-1}) \qquad (4)$$
$$L_3 = \Sigma I_i \cos\phi_i (\phi_i - \phi_{i-1})$$

where at each point $I_i$ is the intensity measured during the $i$th measurement, $\phi_i$ is the difference between the phase angle during the $i$th measurement and the phase angle at the first measurement; and $(\phi_i - \phi_{i-1})$ is the incremental phase change between successive measurements of the intensity. Preferably, the incremental phase change is the same for each measurement of the intensity, a requirement that can readily be met when a stepper motor is used to rotate quarter-wave plate 35 and thereby shift the phase relation between beams 30 and 40.

The first Fourier coefficient $L_1$ is therefore evaluated at each point by summing the product of the intensity $I_i$ and the incremental change in phase angle $(\phi_i - \phi_{i-1})$ for each of the measurements of intensity that are made. Similarly, the Fourier coefficients $L_2$ and $L_3$ are evaluated by summing the product of the intensity $I_i$, the incremental change in phase angle $(\phi_i - \phi_{i-1})$, and the sine or cosine of the increase in phase angle $\phi_i$ for each of the measurements of intensity that are made. From these values of $L_1$, $L_2$ and $L_3$, the unknowns $I_{dc}$, $I_o$ and $\alpha$ can be obtained by the equations (3) above; and from these unknowns, the phase and amplitude of the beam from object 45 can readily be calculated at each point 63 where the intensity of the interference pattern was measured.

The number of times the phase relation should be changed and the intensity measured at the array of sampling points depends on the wavefront to be measured and the accuracy desired. Details on estimating such accuracy as well as performing the calculations may be found in chapter 6 of R. W. Hamming's *Numerical Methods for Scientists and Engineers* (McGraw-Hill, 1962).

To minimize fluctuations in the interferometer or the atmosphere, these measurements should be averaged over several sets of such measurements as is done in the case of the above-described procedure using simultaneous solution of the intensity equations. The phases that are used in the different sets of measurements preferably should not be the same as those used in previous sets of measurements.

Which of the above procedures is preferable depends to a great extent on how the calculations of the phase and amplitude plot is carried out. Advantageously, the computer records both the output of the shaft encoder on motor 36 (and therefore the phase relation between the information and reference beams) and the intensity measurements made at the sampling points on the camera tube as well as calculates the values of $I_{dc}$, $I_o$ and $\alpha$. With a small computer, such as a PDP-8I, that might be dedicated to the wavefront measuring apparatus described above, the intensity measurements can ordinarily be made faster than the computer can solve the sets of three simultaneous equations that relate intensity to phase. In this case, all the data must be stored until after the measurements are made. Solution of 256 sets of three simultaneous equations on the PDP-8I takes about 5 seconds and print out of data on a conventional teletype takes another 90 to 120 seconds. Four times this period is required to solve the equations and print out the results from the sampling of 1,024 points. When a total of 45 interference patterns are measured and averaged by averaging the intensities and phases derived from the solution of 15 groups of three simultaneous equations at each point, the time required for the solution of the equations is increased by a factor of fifteen. Print out times, of course, remain the same.

The measurement procedure using Fourier coefficients is faster and less demanding on storage requirements because it does not require any simultaneous solutions and because it stores for each sampling point only the three sums represented by equation (4) above. As a result, the determination of phase and amplitude plots proceeds in real time and once the measurements are made one need only wait for the print out of the results. A much larger number of measurements, however, are ordinarily required to achieve the same degree of accuracy because the integrals in the Fourier coefficients can only be approximated by summations.

Figure 4:
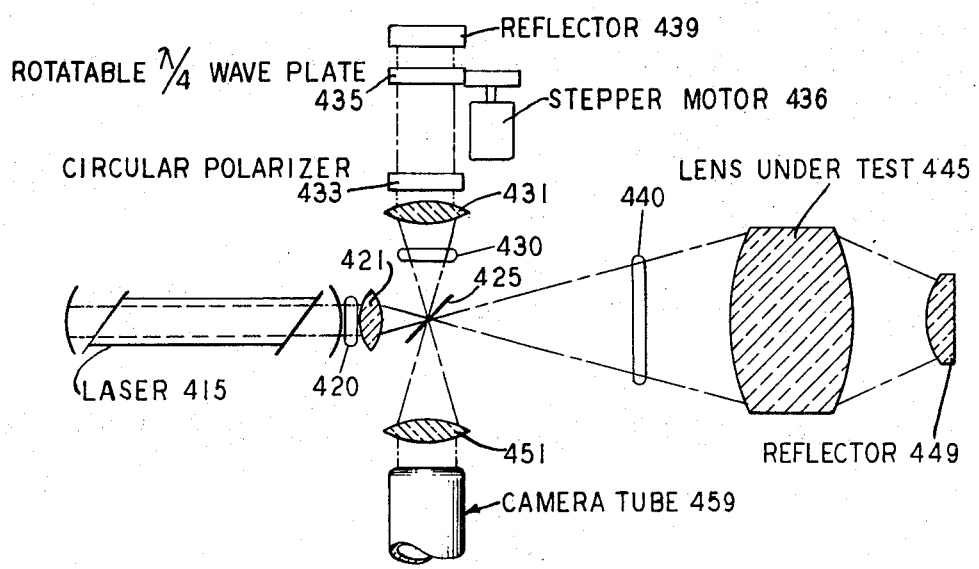

Our invention may be used for any number of wavefront measuring applications. Two such applications are shown in FIGS. 3 and 4. In these FIGS. several of the elements are similar to the elements of FIG. 1 and accordingly have been illustrated using the same reference numbers incremented by 300 or 400 respectively. The additional elements of FIGS. 3 and 4 comprise various lenses or sets of lenses for focusing the beams incident on beam splitter 325. Lens 321 in the path of beam 320 xxx converges that beam to focus on beam splitter 325. Lens 331 in the path of reference beam 330 is likewise located a focal length away from beam splitter 325 and consequently renders beam 320 parallel before incidence on polarizer 323 and converges the beam returned from reflector 329 to focus on beam splitter 325. Lens 351 in front of camera tube 359 images the exit pupil of object 345 onto camera tube 359.

Lens 341 in the path of beam 340 is used to converge beam 340 onto the surface of an object 345 that is being examined. As such, lens 341 changes beam 340 from a diverging beam to a converging beam in the example shown. Replaceable aplanatic attachments 343 further alter the curvature of the beam from lens 341 so that its $f$-number is substantially the same as the desired $F$-number of the surface of object 345. As a result, incident light from aplanatic attachment 343 is retroreflected back on itself through attachment 343 and lens 341 to beam splitter 325. There it is combined with the reference beam returned from reflector 339 to form a set of interference fringes on camera tube 359.

To study the wavefront reflected from object 345, a series of interference patterns is formed on camera tube 359 using different phase relations between reference beam 330 and information beam 340. As indicated above, the unknown values $I_{dc}$, $I_o$ and $\alpha$ can be obtained in a plurality of ways. If desired, three measurements of the intensity can be made at each of the sample points on camera tube 359, using for each measurement a different phase relation between the two beams. From the three resulting equations that relate the intensity to the phase, the three unknowns can be calculated; and from these values phase and amplitude plots of the wavefront from object 345 can be determined. Alternatively, several measurements of intensity can be made at each sample point using a different phase relation for each measurement. These relations between intensity and phase can then be used to evaluate the Fourier coefficients from which it is possible to determine the three unknowns $I_{dc}$, $I_o$ and $\alpha$. Again, phase and amplitude plots of the wavefront from object 345 can be made from these unknowns.

The apparatus shown in FIG. 4 is similar, only in this case the transmission qualities of a lens 445 are examined. Lens 445 is placed in beam 440 and a reflecting surface 449 is placed behind lens 445 so as to return incident light back on itself. Obviously, reflector 449 ideally is optically perfect. Preferably, the shape of its surface coincides with the desired shape of the wavefront from lens 445 so that incident light from the lens is retroreflected on itself. The procedures for measuring the wavefront from lens 445 are the same as those detailed in conjunction with FIG. 3.

As will be obvious to those skilled in the art, numerous interferometers may be used in the practice of our invention. It is only necessary that the reference beam at some point be separate from the information beam so that the phase relation in the reference wave can be altered. Other means for changing the phase relation than the use of a circular polarizer and rotatable quarter-wave plate will be obvious to those skilled in the art. Similarly, the laser, the camera tube, the video analyzer, and the computer described above for use in the invention are only illustrative; and many other such elements can be used in the practice of our invention. Indeed, if desired, the camera tube may be replaced by a single photodetector and that photodetector can be moved across the interference pattern to sample the intensity at an array of points in the interference pattern. Alternatively, with a suitable deflection scheme, the interference pattern can be scanned across a stationary photodetector.

Two methods have been described for the determination of the three unknowns $I_{dc}$, $I_o$, and $\alpha$. Both these methods rely on the sinusoidal (or cosinusoidal) relation between the phase and the intensity that is measured in an interference pattern. Other methods within the spirit and scope of this invention may suggest themselves to those skilled in the art. For example, in some applications the background intensity $I_{dc}$ may be ignored or is already known. In these cases, only two relations between intensity and phase are required to determine the unknowns $I_o$ and $\alpha$. Thus, only two measurements of the intensity need be taken and only one phase shift need be made between these two measurements.

As will be obvious to those skilled in the art still many more modifications may be made to the above described method and apparatus within the compass of our invention.

What Is Claimed is:

1. A method for measuring at least one of the phase and the amplitude at a point in a wavefront comprising:
    forming on a detector at least part of a first interference pattern by interfering thereon the wavefront to be measured and a reference wavefront, there being a first phase relation between said wavefronts;
    sampling and measuring the intensity in the first interference pattern at a point in the wavefront to be measured; changing by a known value the phase relation between the wavefront to be measured and the reference wavefront to a second phase relation;
    forming on the detector at least part of a second interference pattern by interfering thereon the wavefront to be measured and the reference wavefront;
    sampling and measuring the intensity in the second interference pattern at the same point in the wavefront to be measured; and
    determining from the two intensity measurements and the known phase shift at least one of the phase and the amplitude of the wavefront to be measured at the point in that wavefront where the samples were made.

2. The method of claim 1 wherein the intensity is a cosinusoidal function of phase having the general form $$I = I_{dc} + I_o \cos \theta,$$

where $I$ is the intensity measured, $I_{dc}$ is the background intensity, $I_o$ is the magnitude of the cosinusoidally varying intensity, and $\theta$ is the phase angle.

3. The method of claim 1 wherein the phase and amplitude of the wavefront are determined at the point in the wavefront by the simultaneous solution of equations relating the intensity recorded at each point to the changes in the phase relation between the reference wavefront and the wavefront to be measured.

4. The method of claim 1 wherein said method is used to measure the intensity at an array of points in the wavefront to be measured.

5. A method for measuring at least one of the phase and amplitude across a wavefront comprising the steps of:
    a. forming on a detector at least part of a first interference pattern by interfering thereon the wavefront to be measured and a reference wavefront, there being a first phase relation between said wavefronts;
    b. sampling and measuring the intensity in the first interference pattern at an array of points in the wavefront to be measured;
    c. changing by a known value the phase relation between the wavefront to be measured and the reference wavefront to a second phase relation;

d. forming on the detector at least part of a second interference pattern by interfering thereon the wavefront to be measured and the reference wavefront;

e. sampling and measuring the intensity in the second interference pattern at the same array of points in the wavefront to be measured;

f. changing by a known amount the phase relation between the wavefront to be measured and the reference wavefront to a third phase relation;

g. forming on the detector at least part of a third interference pattern by interfering thereon the wavefront to be measured and the reference wavefront;

h. sampling and measuring the intensity in the third interference pattern at the same array of points in the wavefront to be measured; and i. determining from the values of the intensity recorded at each point and the known changes in the phase relation at least one of the phase and the amplitude of the wavefront to be measured at the points in that wavefront where the samples were made.

6. The method of claim 5 wherein the intensity is a cosinusoidal function of phase having the general form $$I = I_{dc} + I_o \cos \theta,$$

where $I$ is the intensity measured, $I_{dc}$ is the background intensity, $I_o$ is the magnitude of the cosinusoidally varying intensity, and $\theta$ is the phase angle.

7. The method of claim 6 further comprising the steps of:
repeating steps (a) through (i) of claim 5; and
averaging the values determined by the repetition of steps (a) through (i) with the values first determined by performing steps (a) through (i).

8. The method of claim 7 wherein at least one of the first, second and third phase relations during the repetition of steps (a) through (i) of claim 5 differs from the three phase relations used in first performing steps (a) through (i).

9. The method of claim 7 wherein the phase relations during the first execution of steps (a) through (i) of claim 5 and the repetition of steps (a) through (i) are randomly selected.

10. The method of claim 6 wherein at least one of the phase and the amplitude of the wavefront are determined by:
measuring the intensity recorded at the points in the array for several different values from 0 to $2\pi$ of the phase relation between the reference wavefront and the wavefront to be measured;
calculating at each point from the relations between the different intensities recorded and the different phases used approximations to a set of Fourier coefficients; and
determining at each point at least one of the phase and the amplitude of the wavefront to be measured from the set of Fourier coefficients for that point.

11. The method of claim 10 wherein at least one of the phase and the amplitude of the wavefront to be measured is determined at the points in the array by:
calculating approximations to the Fourier coefficients $L_1$, $L_2$ and $L_3$ where $$L_1 = \int_0^{2\pi} I\, d\varphi = 2\pi I_{dc}$$

$$L_2 = \int_0^{2\pi} I \sin \varphi\, d\varphi = -\pi I_o \sin \alpha$$

$$L_3 = \int_0^{2\pi} I \cos \varphi\, d\varphi = \pi I_o \cos \alpha;$$

determining $I_{dc}$, $I_o$ and $\alpha$ from the relations
$I_{dc} = L_1/2\pi$
$I_o = (L_2^2 + L_3^2)/\pi$
$\alpha = \arctan(-L_2/L_3)$,
where $\alpha$ is the phase angle during the formation of the first interference pattern; and
determining from the values for $I_{dc}$, $I_o$ and $\alpha$ at each point at least one of the phase and the amplitude of the wavefront to be measured.

12. The method of claim 6 wherein at least one of the phase and the amplitude of the wavefront to be measured is determined by simultaneous solution of the three equations
$I_1 = I_{dc} + I_o \cos(\alpha)$
$I_2 = I_{dc} + I_o \cos(\alpha + \phi_1)$
$I_3 = I_{dc} + I_o \cos(\alpha + \phi_2)$,
where $I_1$, $I_2$ and $I_3$ are the three intensities that are measured, $\alpha$ is the phase angle during the formation of the first interference pattern, $\alpha + \phi_1$ is the phase angle during the formation of the second interference pattern, and $\alpha + \phi_2$ is the phase angle during the formation of the third interference pattern.

13. Apparatus for measuring at least one of the phase and amplitude across a wavefront comprising:
a television camera tube;
means for interfering on the camera tube a wavefront to be measured and a reference wavefront that have a first phase relation to form signals representative of the intensity in the resulting interference pattern at an array of points on the camera tube;
means for producing known changes in the phase relation between the wavefront to be measured and the reference wavefront to alter the intensity in the interference pattern detected at said array of points on the camera tube; and
means for processing signals representative of the changes in the phase relation and the intensities recorded at each point for at least two different phase relations to determine at least one of the phase and amplitude of the wavefront to be measured at the points in said array.

14. The apparatus of claim 13 wherein the means for processing signals comprises means for solving simultaneously equations relating the intensities detected at each point in said array to the changes in the phase relation.

15. The apparatus of claim 14 wherein the means for processing signals comprises means for solving simultaneously at each point three equations
$I_1 = I_{dc} + I_o \cos(\alpha)$
$I_2 = I_{dc} + I_o \cos(\alpha + \phi_1)$
$I_3 = I_{dc} + I_o \cos(\alpha + \phi_2)$,
where $I_1$, $I_2$ and $I_3$ are three intensities measured at each point in said array for three different interference patterns produced by three different phase relations between the interfering wavefronts, $\alpha$ is the phase angle during the formation of the first interference pattern, $\alpha + \phi_1$ is the phase angle during the formation of the second interference pattern, and $\alpha + \phi_2$ is the phase angle during the formation of the third interference pattern.

16. The apparatus of claim 13 wherein the means for processing signals comprises means for calculating a set of Fourier coefficients for each point in said array, from the different intensities recorded and the changes in the phase relation.

17. The apparatus of claim 16 wherein the means for processing signals comprises:

means for calculating approximations to the Fourier coefficients $L_1$, $L_2$ and $L_3$ where $$L_1 = \int_0^{2\pi} I d\varphi = 2\pi I_{dc}$$

$$L_2 = \int_0^{2\pi} I \sin \varphi d\varphi = -\pi I_o \sin \alpha$$

$$L_3 = \int_0^{2\pi} I \cos \varphi d\varphi = \pi I_o \cos \alpha$$

means for determining $I_{dc}$, $I_o$ and $\alpha$ from the relations
$I_{dc} = L_1/2\pi$
$I_o = (L_2^2 + L_3^2)^{1/2}/\pi$
$\alpha = \arctan(-L_2/L_3)$,
where $\alpha$ is the phase angle during the formation of the first interference pattern; and means for determining from the values for $I_{dc}$, $I_o$ and $\alpha$ at each point at least one of the phase and the amplitude of the wavefront to be measured.

* * * * *

UNITED STATES PATENT OFFICE
CERTIFICATE OF CORRECTION

Patent No. 3,694,088                    Dated September 26, 1972

Inventor(s) John E. Gallagher, Donald R. Herriott

It is certified that error appears in the above-identified patent and that said Letters Patent are hereby corrected as shown below:

Column 4, line 10, in equation, the portion "$(\alpha + \varphi_1$" should be "$(\alpha + \varphi_1)$".

Column 6, line 67, change "F-number" to --f-number--.

Column 10, line 10, change $I_o = (L_2^2 + L_3^2)/\pi$ to $$I_o = (L_2^2 + L_3^2)^{1/2}/\pi$$

Column 11, last line, change $L_1 = \int_0^{2\pi} I d\varphi = 2\pi I dc$ to $$L_1 = \int_0^{2\pi} I d\varphi = 2\pi I_{dc}$$

Column 12, line 7, change $Io = (L_{22} + L_3^2)^{1/2}/\pi$ to $$I_o = (L_2^2 + L_3^2)^{1/2}/\pi$$

Signed and sealed this 1st day of May 1973.

(SEAL)
Attest:

EDWARD M. FLETCHER, JR.        ROBERT GOTTSCHALK
Attesting Officer              Commissioner of Patents